United States Patent
Delaby et al.

(10) Patent No.: US 9,644,679 B2
(45) Date of Patent: May 9, 2017

(54) SLEWING BEARING, IN PARTICULAR FOR A VEHICLE

(71) Applicants: Juliette Delaby, Charentenay (FR); Herve Dondaine, Avallon (FR); Michel Nicolas, Annay la Côte (FR)

(72) Inventors: Juliette Delaby, Charentenay (FR); Herve Dondaine, Avallon (FR); Michel Nicolas, Annay la Côte (FR)

(73) Assignee: AKTIEBOLAGET SKF, Gothenburg (SE)

( * ) Notice: Subject to any disclaimer, the term of this patent is extended or adjusted under 35 U.S.C. 154(b) by 100 days.

(21) Appl. No.: 14/830,191

(22) Filed: Aug. 19, 2015

(65) Prior Publication Data

US 2016/0053811 A1    Feb. 25, 2016

(30) Foreign Application Priority Data

Aug. 25, 2014  (FR) ..................... 14 57952

(51) Int. Cl.
*F16C 33/76* (2006.01)
*F16C 33/80* (2006.01)
(Continued)

(52) U.S. Cl.
CPC .......... *F16C 33/7876* (2013.01); *E02F 9/121* (2013.01); *F16C 33/785* (2013.01);
(Continued)

(58) Field of Classification Search
CPC ...... F16C 19/36; F16C 19/361; F16C 19/362; F16C 33/60; F16C 33/61; F16C 33/7823; F16C 33/785; F16C 33/7853; F16C 33/7876; F16C 33/7886; F16C 33/7896; F16C 33/80; F16C 33/805; F16C 2300/14; E02F 9/121
See application file for complete search history.

(56) References Cited

U.S. PATENT DOCUMENTS 2,888,357 A * 5/1959 Pittman ................ C09D 195/00
106/164.12
4,400,042 A * 8/1983 Fritz ....................... F16C 19/14
384/615
(Continued)

FOREIGN PATENT DOCUMENTS

CN    102705374 A    10/2012
DE    3426805 A1 *  1/1986 ............ F16C 19/163
(Continued)

*Primary Examiner* — Phillip A Johnson
(74) *Attorney, Agent, or Firm* — Bryan Peckjian; SKF USA Inc. Patent Dept.

(57) ABSTRACT

A slewing bearing, in particular for a vehicle, comprises an inner ring, an outer ring, at least one row of rolling elements disposed between the inner and outer rings, and a sealing feature that define between the rings a closed annular space within which the rolling elements are disposed. The bearing also comprises at least one seal that is fixed to the outer ring and comprises at least one sealing lip that is oriented towards the outside of the bearing, and at least one deflector that is fixed to the outer ring and comprises a deflecting part that is at least partially offset axially towards the outside with respect to the sealing lip of the seal.

11 Claims, 2 Drawing Sheets

(51) Int. Cl.
    *F16C 33/78*         (2006.01)
    *E02F 9/12*          (2006.01)
    *F16J 15/34*        (2006.01)
    *F16C 19/36*        (2006.01)
    *F16C 33/61*        (2006.01)

(52) U.S. Cl.
    CPC ...... *F16C 33/7823* (2013.01); *F16C 33/7886* (2013.01); *F16C 33/7896* (2013.01); *F16J 15/3456* (2013.01); *F16C 19/362* (2013.01); *F16C 33/61* (2013.01)

(56) References Cited

U.S. PATENT DOCUMENTS

| | | | | |
|---|---|---|---|---|
| 4,861,171 | A | * | 8/1989 | Adachi ................. F16H 57/021 |
| | | | | 384/455 |
| 5,683,186 | A | * | 11/1997 | Akimoto ............... F16C 19/362 |
| | | | | 384/484 |
| 6,050,571 | A | | 4/2000 | Rieder |
| 6,113,276 | A | | 9/2000 | Bourgeois-Jacquet |

FOREIGN PATENT DOCUMENTS

| | | | | |
|---|---|---|---|---|
| EP | 2236869 | A2 | 10/2010 | |
| JP | S52133850 | U | 10/1977 | |
| SE | DE 102005010952 | A1 * | 9/2006 | ........... F16C 19/362 |
| WO | 2013108072 | A2 | 7/2013 | |

\* cited by examiner

SLEWING BEARING, IN PARTICULAR FOR A VEHICLE

CROSS REFERENCE TO RELATED APPLICATIONS

This is a Non-Provisional Patent Application, filed under the Paris Convention, claiming the benefit of French (FR) Patent Application No. 1457952, filed on 25 Aug. 2014, which is incorporated herein by reference in its entirety.

TECHNICAL FIELD OF THE INVENTION

The present invention relates to the field of bearings, in particular bearings comprising an outer ring, an inner ring and at least one row of rolling elements, such as rollers, disposed between the rings.

More particularly, the invention relates to the field of large-diameter slewing bearings that are capable of rotating a mobile part with respect to a fixed part, in particular those used in wind turbines, tunnel-boring machines, such as tunnellers or excavators, vehicles, for example military vehicles, or tower cranes.

PRIOR ART

U.S. Pat. No. 6,113,276 describes a slewing bearing comprising a row of rollers disposed between the inner and outer rings, and seals that radially define between the rings a closed annular space within which the rollers are housed.

Under certain operating conditions, the sealing of such a slewing bearing can prove to be insufficient, in particular for use in a submersible vehicle.

BRIEF SUMMARY OF THE PRESENT INVENTION

The present invention aims to remedy this drawback.

More particularly, the present invention aims to provide a slewing bearing, in particular for a vehicle, which has improved sealing and is easy to manufacture.

In one embodiment, the slewing bearing, in particular for a vehicle, comprises an inner ring, an outer ring, at least one row of rolling elements disposed between the inner and outer rings, and sealing means that define between the rings a closed annular space within which the rolling elements are disposed.

The bearing also comprises at least one seal that is fixed to the outer ring and comprises at least one sealing lip that is oriented towards the outside of the bearing, and at least one deflector that is fixed to the outer ring and comprises a deflecting part that is at least partially offset axially towards the outside with respect to the sealing lip of the seal.

Preferably, the deflector is offset radially towards the outside with respect to the seal. Advantageously, the deflecting part of the deflector radially surrounds the sealing lip of the seal. The deflecting part of the deflector can extend axially or obliquely.

The sealing lip of the seal can project axially with respect to a frontal surface of the ring.

In one embodiment, the deflector is fixed to an outer surface of the outer ring. The deflector can be fixed into a slot formed in the outer surface.

In one embodiment, the seal is fixed into a slot formed on a frontal surface of the outer ring.

In one embodiment, the outer ring comprises at least two assembled partial rings. Seals can be interposed between the partial rings. Alternatively, the inner ring can be produced in one piece.

The invention also relates to a vehicle, for example a tank, comprising a chassis, a turret that is rotatable with respect to the chassis, and at least one bearing as defined above, interposed between the turret and the chassis. The sealing lip of the seal of the bearing interacts by friction with the chassis and the deflecting part of the deflector interacts with the chassis in order to obtain a narrow-passage seal.

BRIEF DESCRIPTION OF THE DRAWINGS

The present invention will be understood better from studying the detailed description of embodiments that are given by way of non-limiting examples and illustrated in the appended drawings, in which.

DETAILED DESCRIPTION OF THE INVENTION

Figure 1:
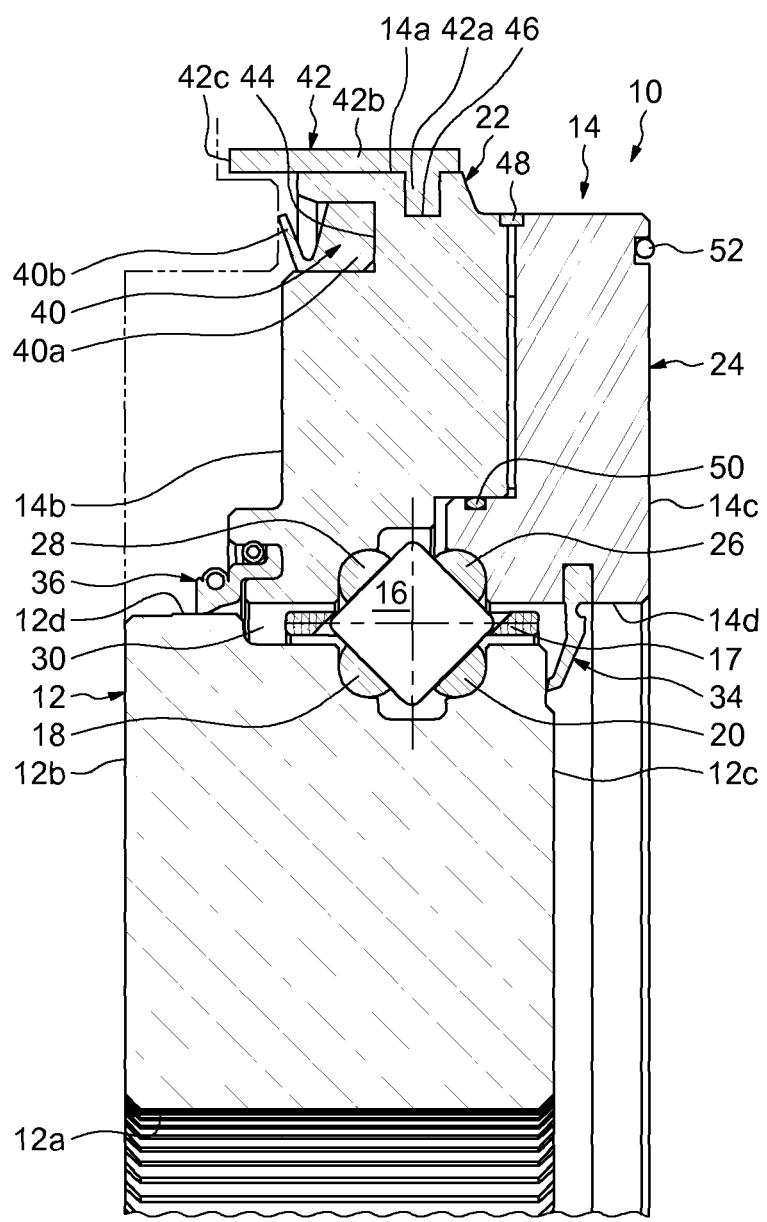
FIG. 1 is a partial view in axial section of a slewing bearing according to a first embodiment of the invention.

In FIG. 1, the large-diameter slewing bearing, which bears the overall reference 10, is used in a submersible vehicle of which the chassis is partially illustrated by way of dotted lines.

The bearing 10 comprises an inner ring 12, an outer ring 14, a row of angular-contact rollers 16 disposed between the rings, and a cage 17 for maintaining the regular circumferential spacing of the rollers. The inner ring 12 and outer ring 14 are concentric and extend axially along the rotation axis (not shown) of the bearing. The inner ring 12 is solid. A "solid ring" is understood to mean a ring of which the shape is obtained by machining with the removal of chips (turning, grinding) from tubes, bars, and forged and/or rolled blanks.

The inner ring 12 is made in one piece and is intended to be fixed to the chassis of the vehicle. The inner ring 12 comprises a bore 12a provided with a plurality of radial teeth (not referenced) that are intended to mesh with gearwheels in order to orient the mobile turret of the vehicle. The bore 12a is bounded axially by two opposite lateral radial surfaces 12b, 12c of the ring. The inner ring 12 also comprises a stepped outer surface 12d in which a groove for fitting the rollers 16 is formed.

The inner ring 12 also comprises an annular inner raceway 18 and an annular inner guideway 20 that are provided for the rollers 16 and are attached to the ring. The raceway 18 and guideway 20 are fixed in the groove formed in the outer surface 12d of the ring. The raceway 18 and guideway 20 are continuous in the circumferential direction. The raceway 18 comes into linear contact with an outer rolling surface of each of the rollers 16. The guideway 20 is intended to come into axial contact with one of the end faces of each roller 16 that axially bound the rolling surface of the roller.

In the exemplary embodiment illustrated, the outer ring 14 is formed by the assembly of two assembled partial rings 22, 24. The outer ring 14 is subdivided in the axial direction by the two partial rings 22, 24. The partial rings 22, 24 can be assembled by being screwed together. The partial rings 22, 24 are of the solid type.

The outer ring 14 is intended to be fixed to the turret of the vehicle. The outer ring 14 comprises a stepped outer surface 14a and two opposite lateral frontal radial surfaces 14b, 14c that axially bound the outer surface. The outer ring 14 also comprises a stepped bore 14d in which a groove for fitting the rollers 16 is formed. The outer surface 14a and the bore 14d of the outer ring are formed by the outer surfaces and the bores of the partial rings 22, 24, respectively. The radial surface 14b is formed on the partial ring 22 and the radial surface 14c is formed on the partial ring 24. The partial ring 22 is mounted axially opposite the partial ring 24, leaving a small axial gap between them. Alternatively, the partial ring 22 can be mounted axially in contact with the partial ring 24.

The outer ring 14 also comprises an annular outer raceway 26 and an annular outer guideway 28 that are provided for the rollers 16 and are attached to the ring. The raceway 26 and guideway 28 are fixed in the groove formed in the bore 14d. The raceway 26 and guideway 28 are continuous in the circumferential direction. The raceway 26 comes into linear contact with the outer rolling surface of each of the rollers 16. The guideway 28 is intended to come into axial contact with one of the end faces of the rollers 16. The raceway 18 of the inner ring and the raceway 26 of the outer ring are opposite and symmetrical with respect to one another along the rotation axes of the rollers. Similarly, the inner guideway 20 and outer guideway 28 are opposite one another. In the exemplary embodiment illustrated, the raceways 18, 26 and guideways 20, 28 are attached to the inner ring 12 and outer ring 14. Alternatively, these raceways and guideways could be formed directly on the rings.

The outer surface 12d of the inner ring and the bore 14d in the outer ring radially define between one another, wherein an annular space 30 within which the row of rollers 16 and the cage 17 are disposed. The bearing 10 also comprises annular seals 34, 36 for closing the annular space 30 defined between the inner ring 12 and outer ring 14. The annular space 30 is protected by the seals 34, 36 from the intrusion of external contaminating particles, such as grease or dust, and from the infiltration of liquids.

The seal 34 is mounted inside an annular slot (not referenced) formed in the bore 14d in the outer ring and projects radially towards the inside so as to come into frictional contact with the frontal surface 12c of the inner ring. The contact between the seal 34 and the inner ring 12 is axial in this case. The seal 36 is mounted inside an annular slot (not referenced) formed in the stepped frontal surface 14b of the outer ring and projects radially towards the inside so as to rub against the outer surface 12a of the inner ring. The contact between the seal 36 and the inner ring 12 is radial in this case. In the exemplary embodiment illustrated, the seal 36 is a spring seal.

The bearing 10 also comprises an annular seal 40 and an annular deflector 42, forming an apron, which are fixed to the outer ring 14. The seal 40 can be made of elastomer, for example nitrile rubber. The seal 40 is intended to limit the infiltration of liquids between the bearing 10 and the chassis of the vehicle, for example during submersion of the vehicle or when running in the wet or during washing. The seal 40 is fixed inside an annular slot 44 formed in the stepped frontal surface 14b of the outer ring. The slot 44 is formed radially close to the outer surface 14a of the outer ring and is oriented axially towards the outside.

The seal 40 comprises an annular heel 40a fixed inside the slot 44 and an annular sealing lip 40b projecting from the heel axially on the outer side, i.e. the side away from the outer ring 14. The lip 40b projects axially with respect to that part of the frontal surface 14b of the outer ring in which the slot 44 is formed. The lip 40b is offset axially towards the outside of the bearing with respect to this part of the frontal surface 14b. The lip 40b is flexible in the axial direction. In the exemplary embodiment illustrated, the lip 40b extends obliquely towards the outside from a small-diameter edge of the heel 40a.

The lip 40b provides a dynamic sealing function with the chassis of the vehicle. The expression "dynamic sealing" is understood to mean sealing between two parts that move relative to one another. The lip 40b comes into frictional contact with the chassis. The lip 40b thus has an area of contact with the chassis. The frictional contact between the lip 40b and the chassis is axial. The free end of the lip 40b advantageously has a triangular shape in cross section in order to limit the friction between the seal 40 and the chassis. The lip 40b is offset radially towards the outside with respect to the seal 36 and, upstream of the seal, forms a prior seal, thereby making it possible to limit liquids reaching as far as the seal.

The deflector 42 can be made of elastomer, for example nitrile rubber, or of steel. The deflector 42 is fixed to the inside of an annular slot 46 formed in the outer surface 14a of the outer ring. The slot 46 is oriented radially towards the outside. The slot 46 is offset axially to the side of the partial ring 24 with respect to the slot 44. The deflector 42 is offset radially towards the outside with respect to the seal 40. The deflector 42 comprises an annular heel 42a mounted in the slot 44 and an annular deflecting part 42b that extends axially from the heel.

The deflecting part 42b partially covers the outer surface 14a of the outer ring and comes radially into contact with the surface. The deflecting part 42b projects axially towards the outside of the bearing with respect to that part of the frontal surface 14b in which the slot 44 is formed and with respect to the lip 40b of the seal. The deflecting part 42b extends axially beyond the lip 40b of the seal. The deflecting part 42b comprises a free end 42c that is offset axially towards the outside of the bearing with respect to the lip 40b. That region of the deflecting part 42b that projects with respect to the frontal surface 14b of the outer ring radially surrounds the lip 40b.

The deflecting part 42b provides a dynamic sealing function with the chassis of the vehicle. The deflecting part 42b radially surrounds the chassis and forms a narrow-passage seal. The narrow passage between the deflector 42 and the chassis is radial in this case. The deflecting part 42b offset radially towards the outside with respect to the lip 40b of the seal forms a prior seal upstream of the lip. This makes it possible to reduce the number of contaminating particles that head towards the lip 40b of the seal and reach the lip. Specifically, when a flow carrying contaminating particles heads from the outside in the direction of the outer ring 14, the deflecting part 42b forms an obstacle preventing the flow from reaching the lip 40b of the seal.

In the exemplary embodiment illustrated, the bearing 10 also comprises an external seal 48 interposed axially between the partial rings 22, 24 of the outer ring, and an internal seal 50 interposed radially between the rings. The bearing 10 also comprises a seal 52 fixed in an annular slot (not referenced) formed in the radial surface 14c of the outer ring.

Figure 2:
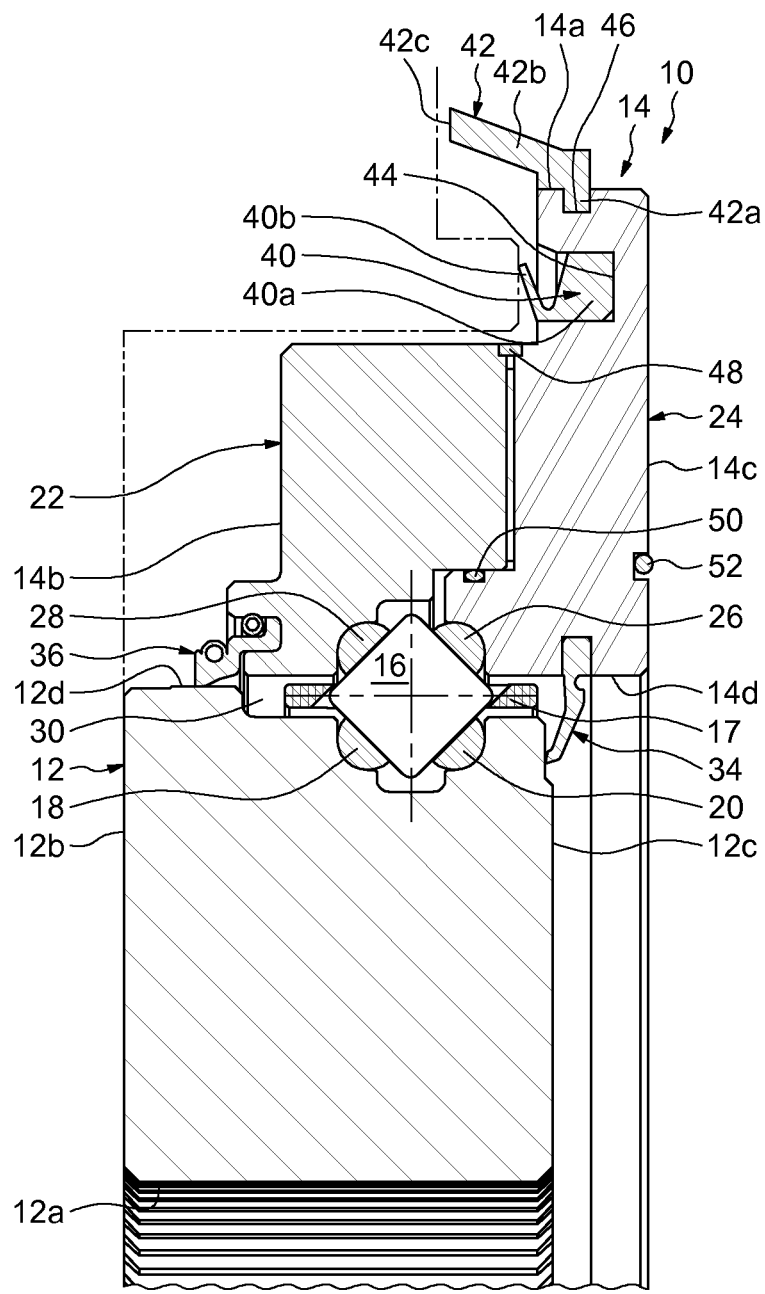
FIG. 2 is a partial view in axial section of a slewing bearing according to a second embodiment of the invention.

In the exemplary embodiment illustrated, the seal 40 and the deflector 42 are mounted on the partial ring 22 of the outer ring. Depending on the design of the chassis of the vehicle, it is possible to fix the seal 40 and the deflector 42 to the partial ring 24 of the outer ring, as is illustrated in the variant embodiment in FIG. 2, in which identical elements bear the same references. In this variant, the radial dimension of the partial ring 24 is reduced. The deflector 42 in this case comprises a deflecting portion 42b that extends obliquely towards the outside from the heel 42a. The narrow passage formed between the deflector 42 and the chassis is axial in this case.

The invention has been illustrated on the basis of a slewing bearing comprising a single row of rolling elements. Alternatively, it is possible to provide a number of rows of rolling elements greater than or equal to two.

The invention provides a slewing bearing that is able to ensure the rotation of a mobile part with respect to a fixed part, the bearing having improved sealing by virtue of the use of the seal and of the deflector that are provided on the outer ring and are able to interact with the fixed part in order to obtain a frictional seal and a narrow-passage seal, respectively, in order to limit the intrusion of contaminating particles and liquids in the direction of the rolling elements.

The invention claimed is:

1. A slewing bearing, in particular for a vehicle, comprising:
    an inner ring;
    an outer ring;
    at least one row of rolling elements disposed between the inner and outer rings;
    a sealing feature that defines between the inner ring and the outer ring, a closed annular space within which the rolling elements are disposed; and
    at least one seal that is fixed to the outer ring, the at least one seal comprising:
        at least one sealing lip that is oriented towards the outside of the bearing, and
        at least one deflector that is fixed to the outer ring and comprises a deflecting part that is at least partially offset axially towards the outside with respect to the sealing lip of the seal.

2. The slewing bearing according to claim 1, wherein the deflector is offset radially towards the outside with respect to the seal.

3. The slewing bearing according to claim 1, wherein the deflecting part of the deflector radially surrounds the sealing lip of the seal.

4. The slewing bearing according to claim 1, wherein the sealing lip of the seal projects axially with respect to a frontal surface of the outer ring.

5. The slewing bearing according to claim 1, wherein the deflecting part of the deflector extends one of axially or obliquely.

6. The slewing bearing according to claim 1, wherein the deflector is fixed to an outer surface of the outer ring.

7. The slewing bearing according to claim 6, wherein the deflector is fixed into a slot formed in the outer surface.

8. The slewing bearing according to claim 1, wherein the seal is fixed into a slot formed on a frontal surface of the outer ring.

9. The slewing bearing according to claim 1, wherein the outer ring comprises at least two assembled partial rings.

10. The slewing bearing according to claim 9, further comprising seals interposed between the partial rings.

11. A vehicle comprising:
    a chassis;
    a turret that is rotatable with respect to the chassis; and
    at least one slewing bearing comprising:
        an inner ring,
        an outer ring,
        at least one row of rolling elements disposed between the inner and outer rings,
        a sealing feature that defines between the inner ring and the outer ring, a closed annular space within which the rolling elements are disposed, and
        at least one seal that is fixed to the outer ring, the at least one seal comprising:
            at least one sealing lip that is oriented towards the outside of the bearing, and
            at least one deflector that is fixed to the outer ring and comprises a deflecting part that is at least partially offset axially towards the outside with respect to the sealing lip of the seal,
    wherein the at least one slewing bearing is interposed between the turret and the chassis, the sealing lip of the seal interacting by friction with the chassis and the deflecting part of the deflector interacting with the chassis in order to obtain a narrow-passage seal.

* * * * *